(12) United States Patent
Stewart et al.

(10) Patent No.: US 7,421,489 B2
(45) Date of Patent: Sep. 2, 2008

(54) NETWORK PROTOCOLS FOR DISTRIBUTING FUNCTIONS WITHIN A NETWORK

(75) Inventors: Daniel B. Stewart, Perth (CA); James M. Botte, Oxford Mills (CA)

(73) Assignee: Nortel Network Limited (CA)

( * ) Notice: Subject to any disclaimer, the term of this patent is extended or adjusted under 35 U.S.C. 154(b) by 930 days.

(21) Appl. No.: 09/751,189

(22) Filed: Dec. 29, 2000

(65) Prior Publication Data

US 2002/0087707 A1 Jul. 4, 2002

(51) Int. Cl.
 *G06F 15/173* (2006.01)
(52) U.S. Cl. .................. 709/224; 709/203; 709/219
(58) Field of Classification Search .............. 709/203, 709/217, 219, 223, 224, 245; 718/105
See application file for complete search history.

(56) References Cited

U.S. PATENT DOCUMENTS

| | | | | |
|---|---|---|---|---|
| 5,740,371 A * | 4/1998 | Wallis | | 709/229 |
| 5,774,660 A * | 6/1998 | Brendel et al. | | 709/201 |
| 6,092,178 A * | 7/2000 | Jindal et al. | | 712/27 |
| 6,108,703 A * | 8/2000 | Leighton et al. | | 709/226 |
| 6,134,588 A * | 10/2000 | Guenthner et al. | | 709/226 |
| 6,173,322 B1 * | 1/2001 | Hu | | 709/224 |
| 6,185,619 B1 * | 2/2001 | Joffe et al. | | 709/229 |
| 6,205,477 B1 * | 3/2001 | Johnson et al. | | 709/220 |
| 6,223,292 B1 * | 4/2001 | Dean et al. | | 726/28 |
| 6,249,801 B1 * | 6/2001 | Zisapel et al. | | 718/105 |
| 6,304,969 B1 * | 10/2001 | Wasserman et al. | | 713/172 |
| 6,314,465 B1 * | 11/2001 | Paul et al. | | 709/226 |
| 6,317,775 B1 * | 11/2001 | Coile et al. | | 709/201 |
| 6,324,580 B1 * | 11/2001 | Jindal et al. | | 709/228 |
| 6,324,582 B1 * | 11/2001 | Sridhar et al. | | 709/230 |
| 6,332,158 B1 * | 12/2001 | Risley et al. | | 709/219 |
| 6,446,108 B1 * | 9/2002 | Rosenberg et al. | | 709/203 |
| 6,446,121 B1 * | 9/2002 | Shah et al. | | 709/224 |
| 6,448,108 B1 * | 9/2002 | Lin | | 438/107 |
| 6,449,647 B1 * | 9/2002 | Colby et al. | | 709/226 |
| 6,470,389 B1 * | 10/2002 | Chung et al. | | 709/227 |
| 6,553,420 B1 * | 4/2003 | Karger et al. | | 709/226 |
| 6,574,229 B1 * | 6/2003 | Takahashi et al. | | 370/400 |
| 6,577,628 B1 * | 6/2003 | Hejza | | 370/392 |
| 6,590,861 B1 * | 7/2003 | Vepa et al. | | 370/216 |
| 6,968,389 B1 * | 11/2005 | Menditto et al. | | 709/233 |
| 6,973,507 B2 * | 12/2005 | Yoon et al. | | 709/245 |
| 2001/0047415 A1 * | 11/2001 | Skene et al. | | 709/226 |
| 2001/0049741 A1 * | 12/2001 | Skene et al. | | 709/232 |
| 2002/0040400 A1 * | 4/2002 | Masters | | 709/228 |
| 2002/0138649 A1 * | 9/2002 | Cartmell et al. | | 709/245 |
| 2003/0097443 A1 * | 5/2003 | Gillett et al. | | 709/225 |
| 2003/0135613 A1 * | 7/2003 | Yoshida et al. | | 709/224 |
| 2005/0207439 A1 * | 9/2005 | Iyengar et al. | | 370/428 |
| 2006/0129665 A1 * | 6/2006 | Toebes et al. | | 709/223 |

* cited by examiner

*Primary Examiner*—Lashonda T Jacobs
(74) *Attorney, Agent, or Firm*—Anderson Gorecki & Manaras

(57) ABSTRACT

A network protocol distributes control and lookup functions among various network elements. Plural servers are permitted to service the same domain name without requiring remapping. Each client or server is permitted to have a different network quality of service level that is provided by one or more network elements of a network or server quality of service level that is provided by a server.

10 Claims, 9 Drawing Sheets

NETWORK PROTOCOLS FOR DISTRIBUTING FUNCTIONS WITHIN A NETWORK

FIELD OF THE INVENTION

The present invention is directed to the transfer of information via a network and, more particularly, to network protocols that permit control functions, such as content and application switching functions, to be distributed among various locations within a network.

BACKGROUND OF THE INVENTION

The protocols used in the Internet, as originally intended, permit only one server to correspond to a given service and a given domain name. Transfer control protocol (TCP) and Internet protocol (IP), referred to as TCP/IP, are examples of Internet protocols that were designed to allow one application running on one computer to communicate with another application running on another computer or on the same computer. The one-to-one mapping is fundamental to the protocols used, and the various infrastructure protocols that were created to support a rapidly growing global TCP/IP-based Internet were designed to facilitate and support the one-to-one communications.

As an example of one-to-one communication, a user of a client device browser program, or similar program, enters the domain name of an Internet site, enters a uniform resource locator (URL) that includes a domain name and a protocol type specification, clicks on a hyperlink to a domain name or to a URL, or otherwise requests a domain name or a URL using hypertext transfer protocol (HTTP), file transfer protocol (FTP) or Telnet, and the browser program or similar program sends a request to a domain name system (DNS) server to look up the domain name and obtain the Internet address that corresponds to the domain name or the URL. The DNS server responds by sending the Internet address of the server that serves the selected Internet site or domain name. Only one Internet address is stored for each domain name.

Other Internet protocols are similarly constructed, such as Hypertext Transfer Protocol (HTTP), Diffserv, IPsec, Secure Sockets Layer (SSL), etc.

The recent explosive growth in Internet and World Wide Web (Web) activity has created a demand for some Web sites or Internet services that far exceeds the capacity of a single server, and the expected growth of multimedia streaming services such as audio and video promises to exacerbate the problem. To prevent server overloading, a "server farm" is used in which multiple servers each store the same Web pages or Internet services. A switching device, such as a content switch, is disposed between the servers of the server farm and the rest of the Internet to process incoming requests from client devices and send the requests to one of the servers. Their incoming request includes an Internet address that corresponds to the desired domain name but which actually directs the request to the switching device. Because the Internet permits only one network address to correspond to a given domain name, the presence of multiple servers that each serve the same Web sites or Internet pages cannot be made known to the client device or to the servers. The content switch must therefore re-map the Internet address contained in the request with the Internet address of the respective server so that it appears to the server that it is connected directly to the client device. Further, the content switch must send responses to the client device that emulate the existence of only a single server and must also re-map the Internet address contained in the responses.

The re-mapping operations thus requires additional content switch processing resources. However, applications that require content switches are becoming increasingly common, thus further taxing the content switch resources and potentially creating processing delays. Content switches are also costly.

It is therefore desirable that a network be configured that accommodates the existence of multiple servers for a given service. Thus, it is desirable that a one-to-many mapping be supported by the network.

Further, newer services, such as multimedia streaming services, required additional bandwidth that is not needed for either network functions. However, many of the presently used applications or present networks do not permit the network or a server to provide different qualities of service for a respective client or for a particular service.

It is therefore desirable to provide the network with the capability of providing different qualities of service.

SUMMARY OF THE INVENTION

The present invention provides network protocols that distribute control and lookup functions among the various network elements, such as to permit plural servers to provide the same services without requiring re-mapping and to permit each client or server to have different network quality of service or server quality of service levels.

In accordance with an aspect of the invention, the transfer of information via a network is controlled. A request is received from a client device for a network address that is associated with a service. A respective one of a plurality of network addresses is selected, each of which corresponds to a respective one of a plurality of servers that are available to provide the service. The respective network address is transmitted to the client device so that the client device may transmit at least one service request associated with the service that is to be directed to the respective network address.

According to another aspect of the invention, a request to determine whether a client device is associated with at least one quality of service level is received from one of a services database server and a domain name server. A response to the request is transmitted to the server such that the server selects a respective one of a plurality of network addresses, each of which corresponds to a respective one of a plurality of servers that are available to provide a service, based on the response.

According to a further aspect of the invention, a request by a service server that is currently designated to receive service requests from a client device is transmitted to a further service server for the further server to receive further service requests from the client device. The service server and the further server are each associated with a common service. A response from the further service server is received. When the response is favorable, an indication to the client device that the further service request are to be directed to the further server is transmitted.

According to a still further aspect of the invention, a request for an available further service server that is associated with a service is received from a service server that is currently designated to receive service requests from a client device. The service server and the available further service server are each associated with the service. A network address for the available further service server is transmitted to the server such that the server may transmit a request to the further service server for the further service server to receive service requests from the client device.

According to yet another aspect of the invention, a request for a quality of service level associated with a client device is transmitted to a database. The quality of service level associated with the client device is received from the database. A request to provide the quality of service level is transmitted to a network. When the request for the quality of service level is accepted, a notification of the quality of service level is transmitted to the client device.

According to still another aspect of the invention, a request to provide a quality of service level for a client device is received from either a server or a client device. A request to verify that the quality of the service level is associated with the client device is transmitted to a database. When the quality of service level is verified, a notification is transmitted to the server or the client device that the request to provide the quality of service is accepted.

In accordance with an additional aspect of the invention, a request to verify whether a client device is associated with a quality of service level is received from at least one of a network and a server. A response to the request is transmitted to the network or the server such that the network provides the quality of service level for the client device based on the response.

According to a still additional aspect of the invention, a service request at a quality of service level is received from a client device. A request to verify that the quality of service level is associated with the client device is transmitted to a database. When the quality of service level is verified, a response is transmitted to the client device at the quality of service level.

Other features and advantages of the present invention will become apparent from the following detailed description of the invention with reference to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

The invention provides network protocols that distribute application and content functions among various network elements. Included are protocols for performing lookup functions that recognize a one-to-many mapping, that permit an application to take advantage of load balancing of server farms, and/or permit service level negotiation, cache maintenance, updates of domain name and service type table entries, client and/or server negotiation with network elements which may involve a services database, network element to network element negotiation which may involve a services database, and server to server coordination for load balancing including seamless handoff of a client transaction.

The protocols of the invention also provide the ability to provide differentiated services as part of an initial server lookup by the client, such as a lookup by a domain name system server in a services database. The invention also provides differentiated services as part of a client and/or service lookup by a server when a request is received, when redirection is requested, or in the middle of a session when a particular service is accessed. The request may be to a services data base. The invention further provides differentiated services as part of a lookup by a network element that is attempting to route a request, such as when a client has paid for a better class of service or when a service provider, such as a company with web site, pays a network services provider for a better class of client service.

An explicit one-to-many Internet mapping is provided in place of the current Internet one-to-one mapping. Supporting protocols, such as DNS, BGP, and HTTP, may be modified to support the one-to-many mapping as well as service level lookup.

Figure 1:
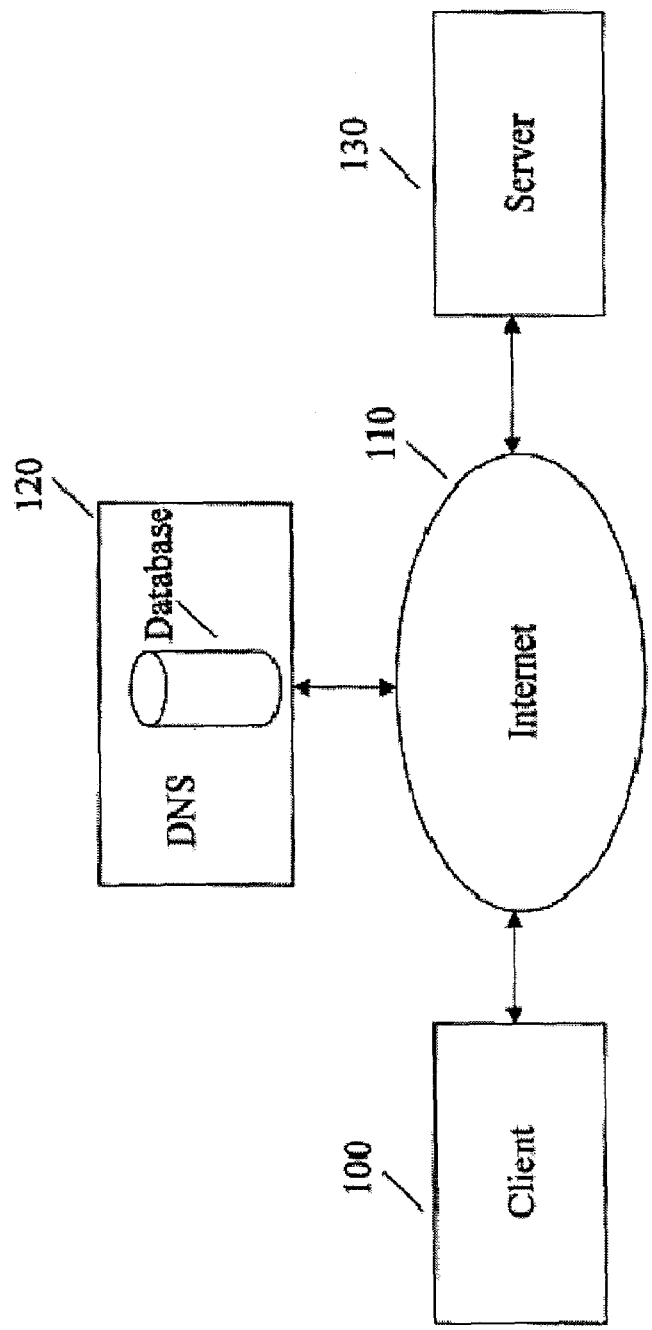
FIG. 1 is a block diagram showing a known arrangement of a network in which each domain name is serviced by a single server.

FIG. 1 shows an example of a known arrangement for a network. A domain name system (DNS) 120 includes a database having domain names and the network address, such as the Internet protocol (IP) address, of the server 130 that services the domain. Only one network address is stored for each domain name or service so that only one server may be accessed when the address of a domain name or service is requested.

When a user enters the domain name or a URL into a location on a browser program or similar program screen or when a user clicks on a hyperlink to the domain name or URL, the client device 100 sends a request via a network 110, such as the Internet, to the DNS server 120 and receives the network address from the DNS server via the network. The client device may then transmit service requests to the server 130 via the network 110 using the network address. If too many requests are made to the domain name, the server is overloaded, thus causing delays and possibly causing the server to fail.

Figure 2:
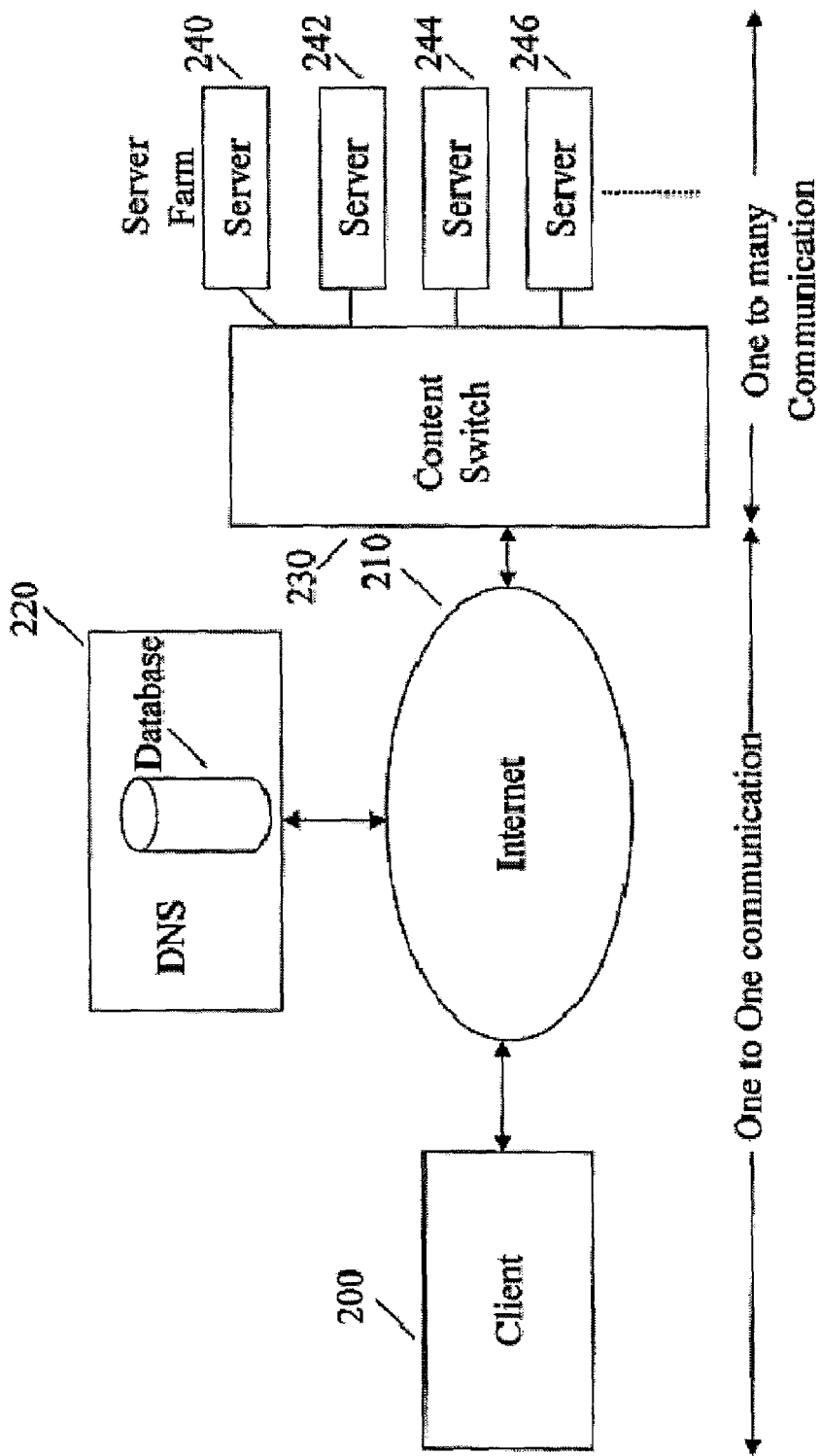
FIG. 2 is a block diagram showing a known arrangement of a network in which a domain name may be serviced by plural servers in a server farm that are connected to the Internet via a content switch.

FIG. 2 illustrates an example of another known network arrangement in which plural servers provide the same service. When a client device 200 request a network address from a DNS server 220 in the manner described above, the DNS server supplies the client device with the network address of a content switch or similar device 230. The client device, using the network address, may send service requests via the network 210 to the content switch 230 in a manner as if the client device were communicating directly with a server. The content switch then re-maps the network address in the service request with the network address of one of the servers 240, 242, 244, 246, ... of a server farm and then forwards the service request to the respective server. When the respective server sends a response to the request, it includes the network address of the server and not that of the content switch. The content switch then re-maps the address of server with its own address. Thus, the client device communicates with the content switch as if it was communicating directly with a single server, and the server communicates with the content switch as if it were communicating directly with the client device without the existence of the other servers.

The arrangement of FIG. 2, however, requires the use of an additional network device, such as the content switch, and the use of additional processing power and processing time to carry out a remapping step whenever a service request is transmitted from a client device to a server.

Figure 3:
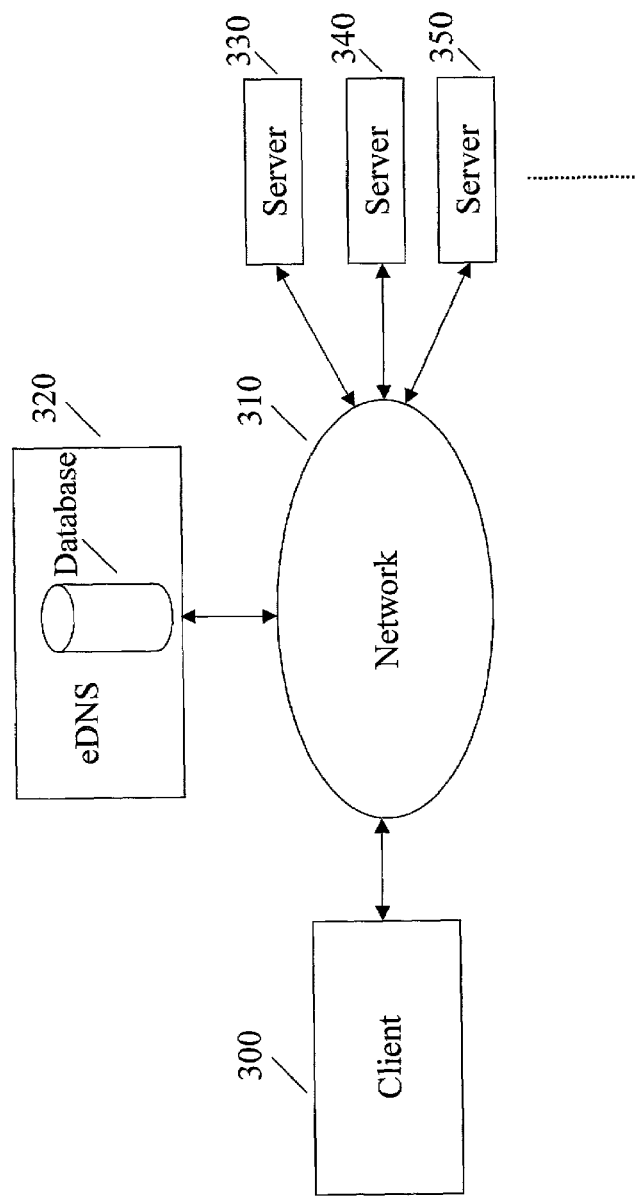
FIG. 3 is a block diagram showing an example of an arrangement in which plural servers service a respective domain name or URL using a protocol in accordance with of the protocol of the invention.

Thus, FIG. 3 shows an example of an arrangement in which protocols of the invention are provided that permit multiple servers to provide the same service without requiring added network devices. An extended domain name system (eDNS) server 320 includes a database that is capable of storing more than one network address for a particular service or domain name, namely the network addresses of more than one server. The eDNS server may also store information such as the availability of each of the corresponding servers, the order of priority for selecting one of the plural servers, and/or the locations of the servers.

When a client device 300 sends a request for the network address corresponds to a desired service to the eDNS server 320 via a network 310 comprised of plural network elements, such as the Internet, an Intranet, a service provider (SP) network, or other networks, the eDNS server responds by transmitting the network address of one of a plurality of service servers 330, 340, 350, ..., such as application servers, email servers, other messaging servers, Web servers, or other service servers. The eDNS server 320 may select the respective server based on one or more selection criteria such as the order of priority of the servers, the server nearest to the client device, the quality of service provided by a particular server, and/or the availability of a server. The client device 300 may then transmit service requests, via the network 310, that include the actual network address of the server that will service the client.

The client typically supplies a service request to the eDNS server that at least includes the service type requested and a domain name. The client may also provide a service-level class request, i.e. request a preferential level of services, wherein the client also provides an identifier that can be mapped to the database associated with a particular domain name. The domain name can have its own collection of service classes subject to further standardization. The client may have also already gone to a services database and requested a service-level authorization, such as for preferential treatment by the server that will provide the service requested by the client or by the network itself. In such a case, the client will provide a service authorization "handle" that the eDNS server can use to verify the service-level agreement and to verify the identity of the client.

The eDNS server also has information from/about the target provider, e.g. explicit knowledge of multiple server IP addresses, server "health", server weighting, server location, etc., that was negotiated and/or communicated. When the server or the network is offering the client an enhanced service level, the eDNS server sends the client an authorization handle to use when going out over the network, along with a protocol directive on how to proceed. In determining which IP address, and port number, and other authorizations or directives to return to the client, the eDNS server takes into account the client information as well as the server information. The eDNS server may also implement other features such as round-robin load balancing among available servers for a particular service in the absence of any specific directive.

The service servers also communicate "health" information about its state of operation to the other servers that are providing a particular service, even if the servers are geographically separated. The information is used to help each application on the servers to properly load balance and to potentially recover from application level, network level, or server hardware failures by redirecting clients and by updating eDNS servers with new health information.

Further, if the selected server subsequently becomes unavailable or overloaded during a session with the client device, the server may "hand-off" operation to another one of the servers by transmitting messages to the new server, either via the network or by a direct connection with the new server, and to the client device, via the network. The server then notifies the eDNS server of its unavailability or diminished desirability. Thus, when a server becomes overloaded, must be brought down for maintenance or because of operational problems, or wishes to transfer the client to a server better suited for a particular service or a particular client, the server is capable of handing the client device off to another server without interrupting the session at the client device. The hand-off is coordinated between the original server and the new client sever using a hand-off extension to the existing protocol.

Figure 4:
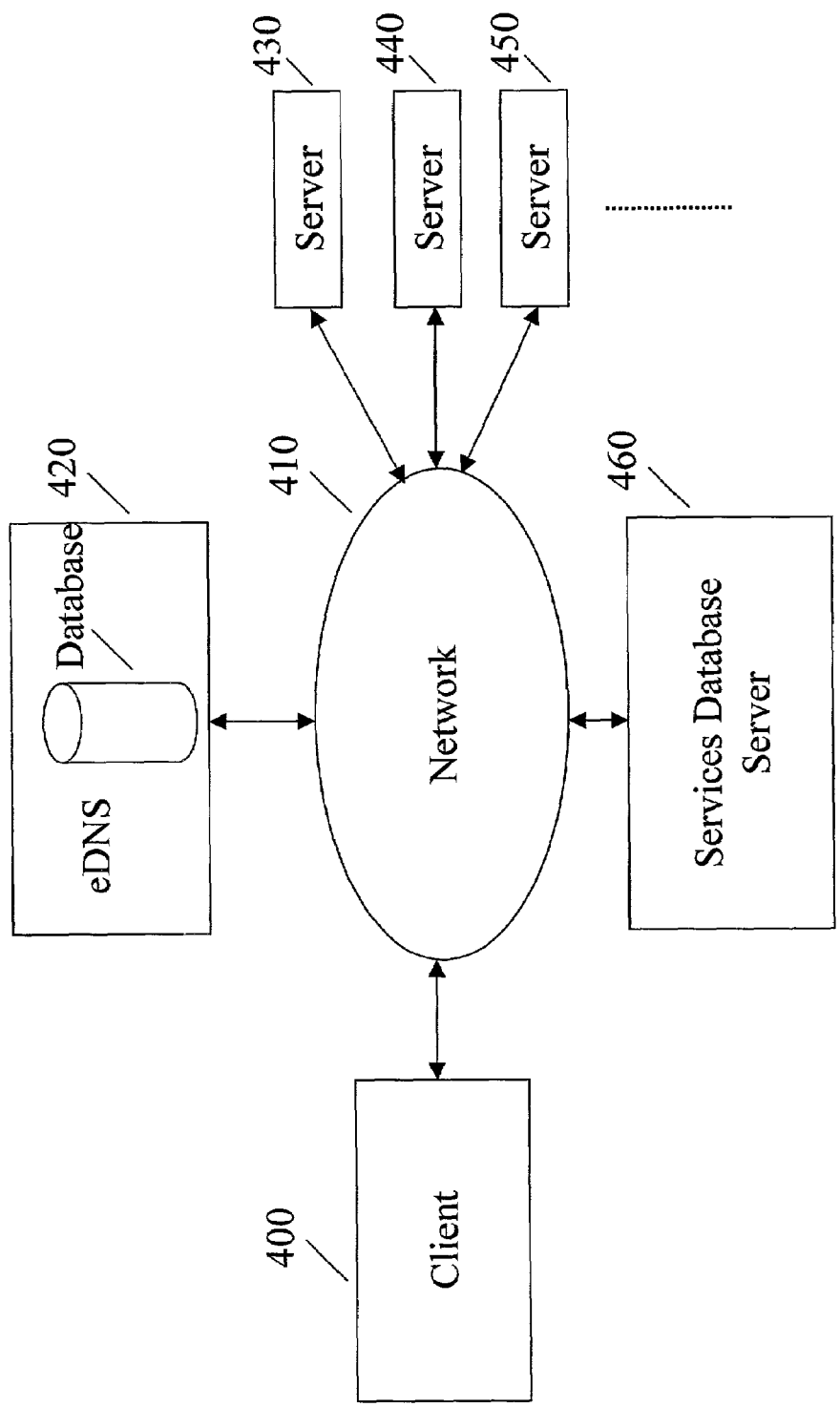
FIG. 4 is a block diagram showing an example of an arrangement in which plural servers service a respective domain name or URL and in which plural qualities of service are provided using a protocol of the invention.

FIG. 4 depicts another example of the invention in which protocols of the invention permit a client device or a server to select from one or more quality of service (QoS) levels as well as provide the functions carried out the network of FIG. 3. The quality of service levels may include different server quality of service levels, such as whether to provide web pages or other network services that have enhanced features or whether to use a better class of server having a lower latency and/or that handles fewer connections. Alternatively, the class of service levels may include different network quality of service levels, such as the amount of network bandwidth used, etc.

A services database server 460 stores information concerning the quality of service that is permitted to each of various client devices and servers. The services data base server receives requests from the network 410 and/or from the servers 430, 440, 450, ... regarding whether a respective client and/or a respective server has permission to receive a higher network quality of service. The server 460 verifies whether such permission exist and transmits a response to the network and/or the server. The services database server may also receive requests from the servers 430, 440, 450, ... regarding whether a respective client has permission to receive higher server quality of service levels and either allows or denies such requests.

Figure 5:
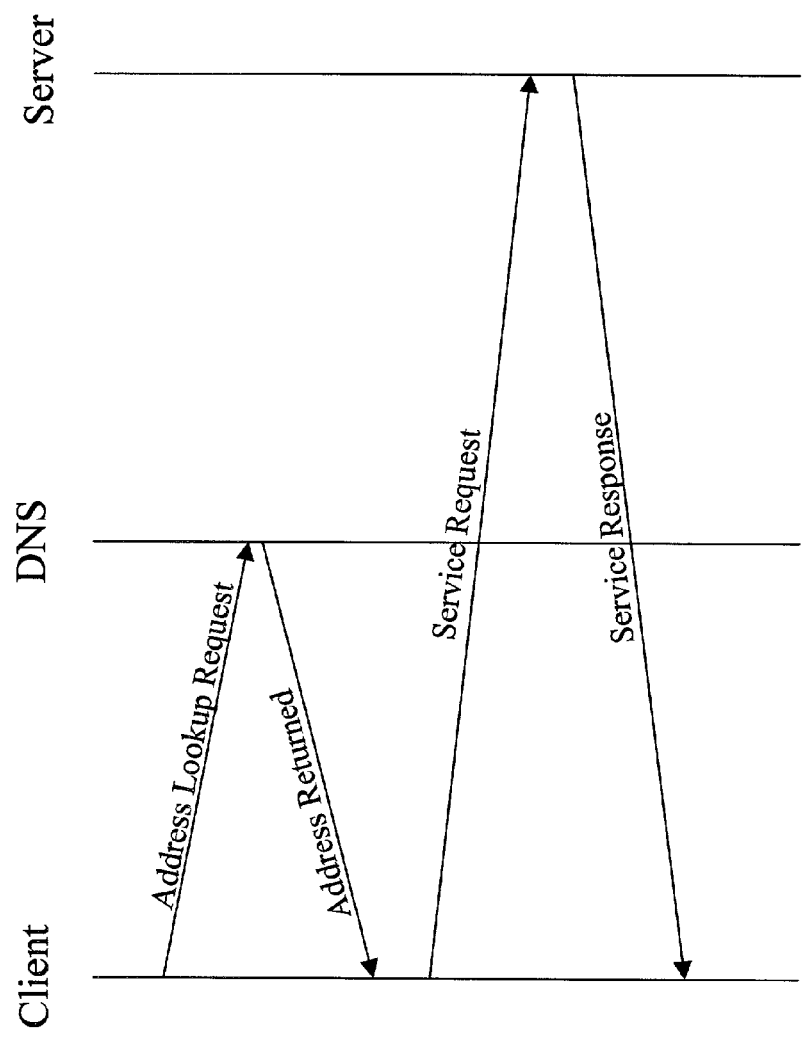
FIG. 5 is a diagram showing known requests and responses between a client device, a DNS and a server.

FIG. 5 illustrates an example of the Internet protocol of an existing network, such as is shown in FIGS. 1 and 2. A user enters a request for a domain name or a URL using a client device browser program, or using an other HTTP request, FTP request or Telnet request, or other Internet protocol request and the client device transmits an Address Lookup Request to the DNS that request the IP address or other network address of the server that services the requested domain name or URL. The DNS returns the IP address or other network address of the server or, when more than one server services the requested domain name or URL, the DNS transmits the IP address or other network address of a content switch or similar network device. The client device may then transmit service requests, such as requests for Web pages or other network services, to the server, content switch, or other network device using the address supplied to it by the DNS. When the request is received, a response to the service request is sent from the server to the client device.

FIGS. 6, 7, 8 and 9 illustrate examples of protocols of the invention.

A Universal Resource Locator (URL) is used instead of the domain name. The URL includes a protocol specification, e.g. "http:", a domain name, e.g. www.ballyhoo.com, and an optional port number, e.g. "8080", in the form of "http://www.ballyhoo.com:8080", for example. By using a URL, both the mapping class, i.e. the domain name, and the service type, i.e. the protocol and port specification, are available so that the eDNS server knows what the client is attempting to do. For example, a single domain name, i.e. a collection of servers, may provide several different services, such as a sub-set of a server farm that provides FTP services while the entire server farm is provides HTTP services. Thus, the domain name and the service name are used as input for mapping to an IP address.

The eDNS server returns the IP address and port number of server that provides the service requested by the client. Alternatively, the eDNS server returns the IP address and port number based on a service-level agreement looked up in a database, namely a preferred client gets connected to a server port 8000 rather than the standard port 80 for an HTTP request so that it is given a different priority or a different look and/or feel.

Figure 6:
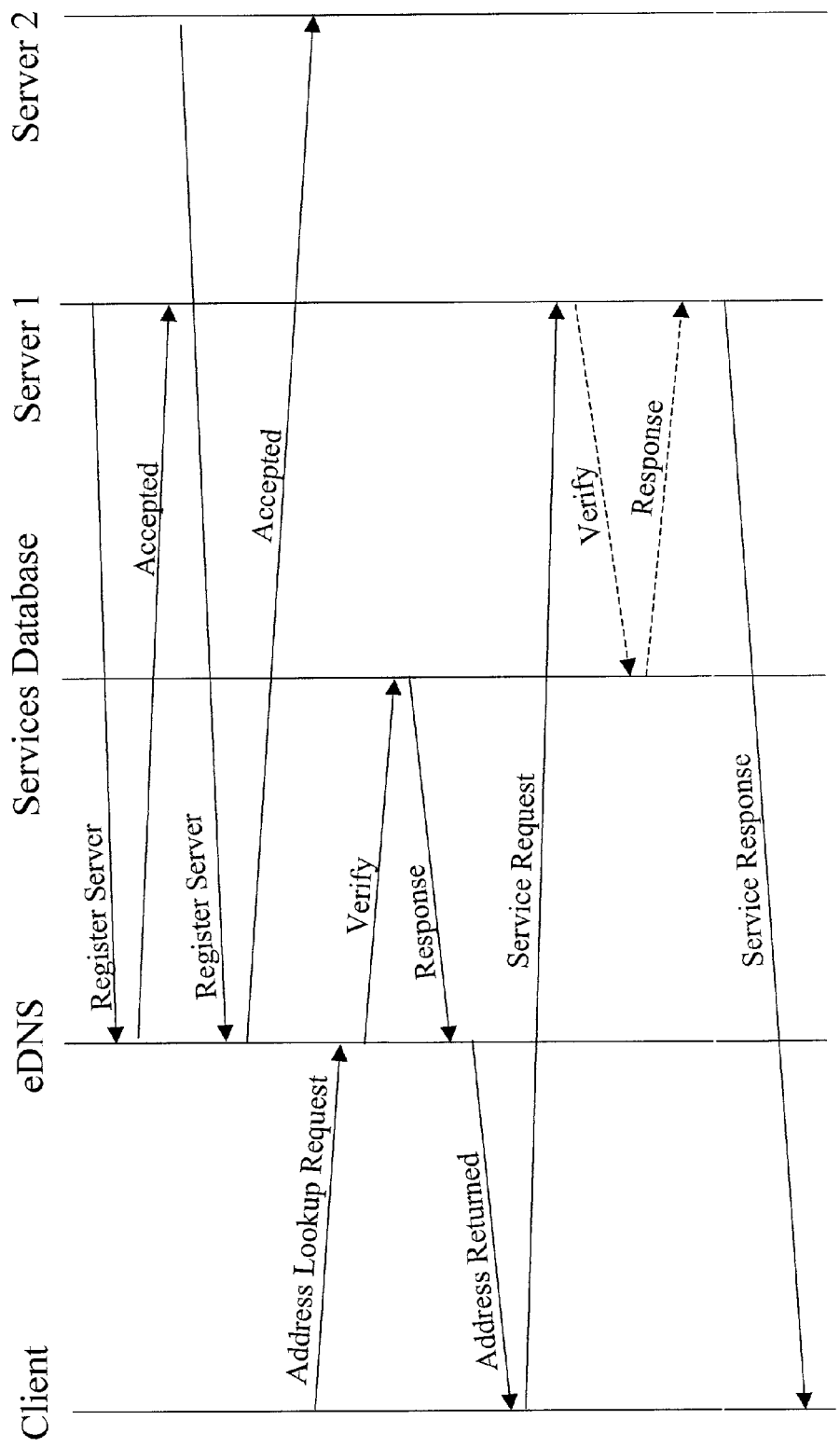
FIG. 6 is a diagram showing a transaction in which a client device obtains service in accordance with an example of a protocol of the invention.

FIG. 6 illustrates an example of a network protocol of the invention for basic transactions. First, one or more service servers that are available to provide the same service, such as Server 1 and Server 2, inform the eDNS server that they are available to accept service requests. The available servers each transmit a message, such as a Register Server request, that includes the domain name, the network address of the service server and the services that the service server accepts. The servers may also provide authentication and non-repudiation information to the eDNS server that establishes the validity of the server for serving the domain name. When a service server is authenticated, the eDNS server transmits a message to Server 1 or Server 2 that its authentication and non-repudiation has been accepted and adds the address of the server to a list of network addresses of servers that are available to provide the service.

Subsequently, when a client device desires to access a service and sends a request to the eDNS for a network address that corresponds to the domain name, the eDNS may first access the services database to determine whether there are any special permissions or denials that are associated with the client. As an example, the services database may recognize that the client is a frequent user of the requested service, is a prior customer of the requested service, or has paid for a higher quality form of the service, and notifies the eDNS to respond to the client device with a network address of a server that provides the higher quality service. Alternatively, the services database recognizes that the client is an undesired client and informs the eDNS server accordingly so that the eDNS server returns the network address of a server that provides lesser quality service or denies the request of the client device. As a further alternative, the services database may not recognize the client device and informs the eDNS server to respond with the network address of the server that provides standard service.

The client device may then transmit one or more Service Requests to the network address provided by the eDNS server. The Service Requests are delivered to the selected server which, in turn, delivers one or more responses to the client device. The service server may also, prior to responding to the service request of the client device, transmit a request to the services database to verify that the quality of service requested by the client device is permitted to the client device and, based on the response received from the services database, deliver or deny the requested quality of service to the client device.

Figure 7:
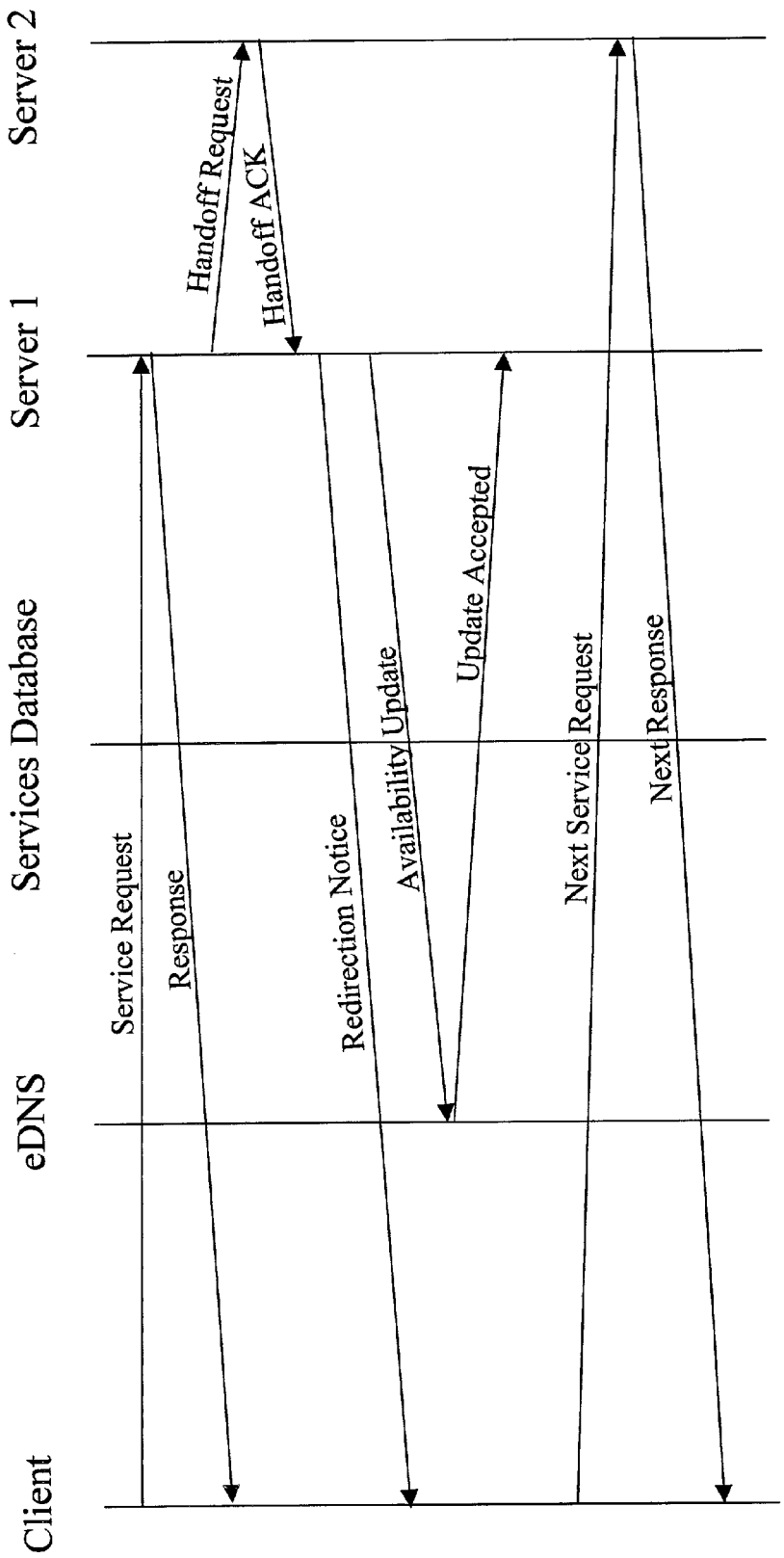
FIG. 7 is a diagram showing a service handoff between servers in accordance with an example of a protocol of the invention.

FIG. 7 illustrates an example of a protocol for carrying out a server to server hand-off of a client device in accordance with the invention. As described above, the client device requests a network address of a server that provides a service and receives the network address of a service server, such as Server 1. After the client device has transmitted one or more Service Requests to the Server 1 and has received responses thereto, Server 1 transfers communication with the client to another server. Server 1 first transmits a request to a local database (not shown) or to the eDNS server to determine the network address of the next available server and, as an example, receives the address of Server 2. Server 1 transmits a Handoff Request to Server 2 that may include information about the client. The client information may include cookie or other state information, security information, transaction state information such as the client's shopping cart, or other Open Standard Interconnection (OSI) reference model layers 4 or layers 5-7 protocol information. When Server 2 is available, Server 2 sends a Handoff Acknowledge message to Server 1. Server 1 then transmits a message, such as a Redirection Notice, that informs the client that future service requests to the service are to be sent to the network address of Server 2. The client may then send Service Request to the network address of Server 2 and receive responses thereto from Server 2.

Further, Server 1 may also send a message to the eDNS server, such as an Availability Update, that informs the eDNS server that it is no longer available to serve that given domain name. The eDNS server then updates its database and replies with a message indicating that the update was accepted.

As an example, Server 1 transmits a Handoff Request to Server 2, as described above, when Server 1 is overloaded with requests, needs to shut down for routine maintenance or to correct an operational problem, or wishes to upgrade or downgrade the server quality of service provided to the client.

Figure 8:
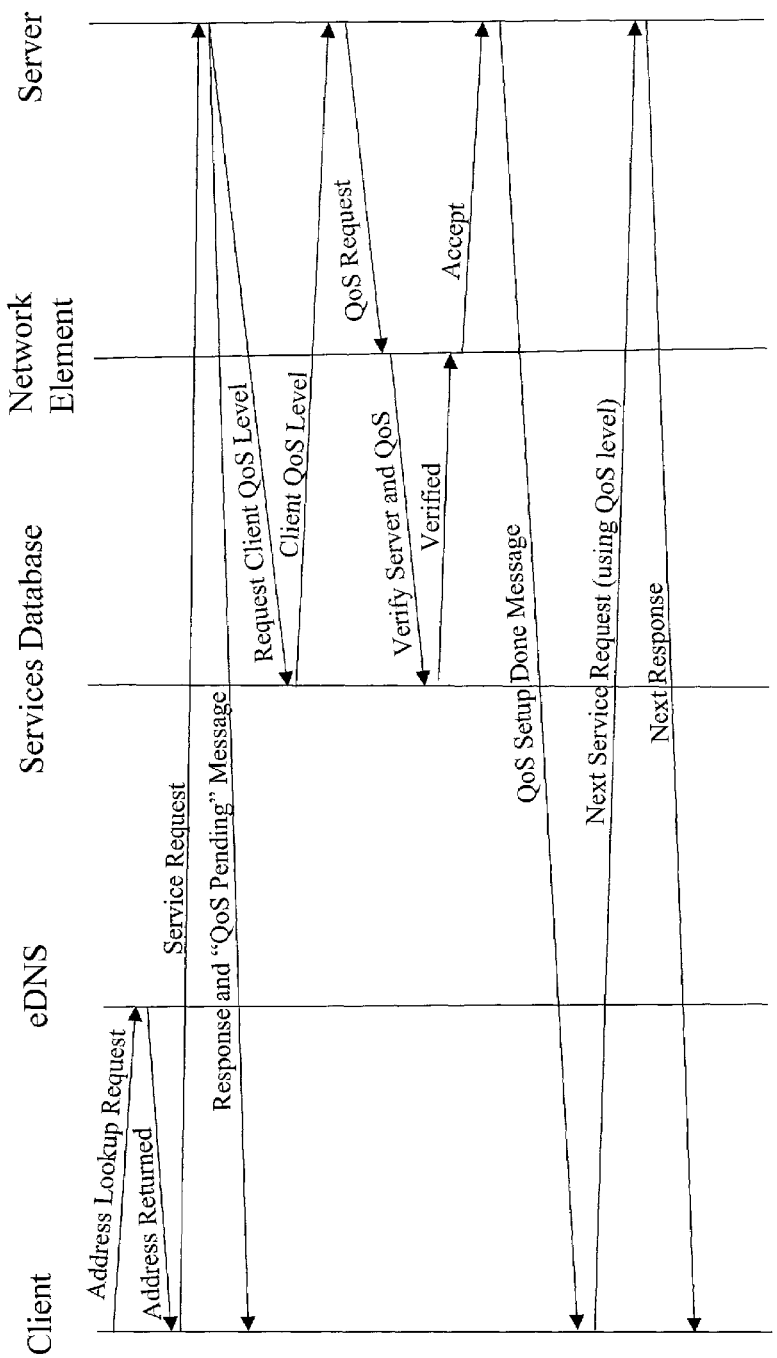
FIG. 8 is a diagram showing a server-initiated quality of service level set-up operation in accordance with an example of a protocol of the invention.

FIG. 8 depicts an example of a protocol for carrying out a server-initiated network quality of service (QoS) transaction according to the invention. After a client transmits a request to the eDNS server for a network address corresponding to a desired service and receives the network address as described above, the client transmits a Service Request to the service server. The service server sends a response to the Service Request that includes a message, such as a "Quality of Service Pending" message, that informs the client that the server is determining the network quality of service level that is associated with the client. At the same time, or shortly thereafter, the server transmits a message to the services database to determine the network quality of service that the client is permitted to receive. The service server may also request that the services database provide it with the server quality of service that the client is permitted. The services database then looks up the client in its database and informs the service server of the quality of service level associated with the client.

Then, the service server transmits a request to at least one network element of the network that asks the network element to provide the associated quality of service for all communication between the service server and the client. The network element may also determine whether the client is entitled to receive the desired quality of service and whether the server is permitted to make such a request by transmitting a verification message to the services database. When verification is received from the services database, the network element transmits a message to the service server indicating that its request was accepted.

Thereafter, the service server transmits a message to the client, such as a "Quality of Service Setup Done" message, that informs the client of the network quality of service level that it is to receive. The service server, at this time, may also handoff the client to another server that provides the desired quality of service level, as described above, and inform the client of the new network address together with the quality of service level.

The level of network quality of service may be transparent to the user of the client device or, alternatively, may be displayed to the user at a location on a display screen of the browser program or other program.

The Quality of Service Setup Done message may be sent to the client while the client is receiving a response to an earlier Service Request from the server, such as when the client is receiving a Web page from the server. The client may then continue receiving the services or the Web pages using the new quality of service level, and possibly from another server, in "mid-byte stream" without interruption.

Thereafter, the client may transmit further Service Requests using the new quality of service level and receive responses accordingly.

Figure 9:
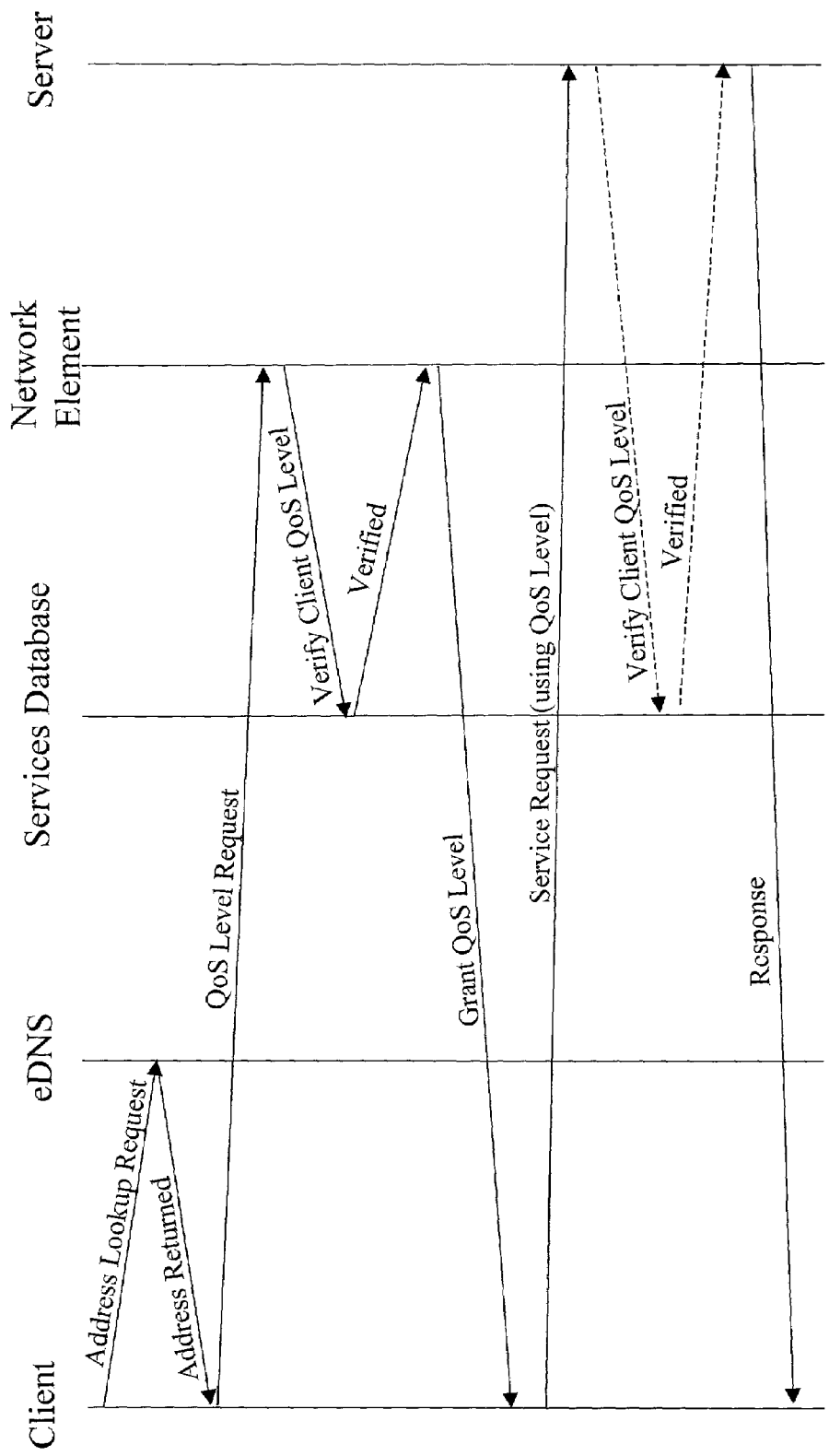
FIG. 9 is a diagram showing a client-initiated quality of service level set-up operation in accordance with an example of protocol of the invention.

FIG. 9 illustrates an example of a protocol for a quality of service level transaction that is initiated by the client. After the client sends a request to the eDNS server for a network address that corresponds to a desired service and receives the network address from the eDNS server, as described above, the client transmits a request for a desired network quality of service level to the network.

At least one network element of the network transmits a verification request to the services database to determine whether the client is permitted to receive service at the desired quality of service level. The services database determines whether the client is entitled to the desired quality of service level and notifies the network element accordingly. When the quality of service level request is accepted, the network element delivers a message to the client that the request has been granted. Thereafter, the client may transmit Service Requests using the granted quality of service level to the service server and receives responses thereto from the service server.

The service server, before transmitting a grant or deny response to the client, may also transmit a request to the services database to verify that the client is entitled to receive network and/or server quality of service at the desired level.

Thus, by distributing the application switching and content switching functions over the network, the protocols of the invention provide the network with, for example, the flexibility to provide a client with one of a plurality of servers that correspond to a requested domain name based on the availability of a server, the location of a server, the server quality of service that is to be provided to the client and/or the network quality of service to be provided to the client. As a further example, the protocols of the invention enable a server to readily handoff a client to another server as needed or to provide the client with a different server quality of service or network quality of service. The handoff may be carried out in a manner that is transparent to the client. As an additional example, the protocols of the invention permit the ready determination and verification of the service and the network quality of service network levels to which a client and/or a server is entitled.

The invention also permits geographic positioning of the service servers to be included in routing decisions. As an example, the servers of a "server farm" may be distributed geographically. The eDNS server may take into account the physical distance between the client and the service server when selecting a respective service server. The geographical information may be included in the network protocols. As a result, a company that provides a service may have multiple points of presence across a nation, across a continent, or across the globe so that customers in particular geographic regions are preferentially routed to the nearest point of presence. When the nearest point of presence is overloaded or malfunctioning, the client is alternatively redirected to another point of presence.

Additionally, the protocols of the invention permit one of a plurality of eDNS servers to function as a "master" server for particular service or domain name. The master server ensures that any cached entries for the domain name or service are correctly updated in the other eDNS servers. The master server also propagates changes in the server mappings, the "health" of respective servers and the weighting of the service servers to the other eDNS servers.

Although the present invention has been described in relation to particular embodiments thereof, many other variations and modifications and other uses may become apparent to those skilled in the art. It is preferred, therefore, that the present invention be limited not by this specific disclosure herein, but only by the appended claims.

What is claimed is:

1. A method, associated with a domain name system server, of controlling the transfer of information via a network, said method comprising:
   receiving, by the domain name system server from the client device, a request for a network address that is associated with a service, the request including a client identifier and a service authorization handle comprising authorization information for indicating the client is authorized for a level of service for the handling of the request;
   selecting, by the domain name system server in response to service type and the service authorization handle, respective network address of one server selected from a plurality of servers that are available to provide the service; and
   transmitting, from the domain name system server to said client device, said respective network address so that said client device may transmit at least one service request associated with said server to the selected server associated with the respective network address without the service request being re-mapped by an intermediate device.

2. The method of claim 1 further comprising:
   receiving, from at least one further server, an indication that said further server is available to receive requests associated with said service at the authorized level of service; and
   incorporating said network address of said further server into said plurality of network addresses.

3. The method of claim 2 wherein said indication includes at least one of:
   a network address of said further server, said service and authentication and non-repudiation information.

4. The method of claim 1 further comprising:
   transmitting, to a database, a request to determine whether said client device is associated with at least one quality of service level indicated in the service authorization handle;
   receiving, from said database, a response to said request; and selecting said respective one of said plurality of network addresses based on said response.

5. An apparatus, associated with a domain name system server, of controlling the transfer of information via a network, said method comprising:
receive, from the client device, a request for a network address that is associated with a service, the request including service authorization handle for indicating the client is authorized for a level of service for the handling of the request;
select, in response to service type and the service authorization handle, respective network address of one server selected from a plurality of servers that are available to provide the service; and
transmit, to said client device, said respective network address so that said client device may transmit at least one service request associated with said server the selected server associated with the respective network address without the service request being re-mapped by an intermediate device.

6. The apparatus of claim 5 further configured to: receive, from at least one further server, an indication that said further server is available to receive requests associated with said service at the authorized level of service; and incorporate said network address of said further server into said plurality of network addresses.

7. The apparatus of claim 6 wherein said indication includes at least one of: a network address of said further server, said service, and authentication and non-repudiation information.

8. The apparatus of claim 7 further configured to:
transmit, to a database, a request to determine whether said client device is associated with at least one quality of service level indicated in the service authorization handle;
receive, from said database, a response to said request; and
select said respective one of said plurality of network addresses based on said response.

9. An apparatus, associated with a domain name service server, for controlling the transfer of information via a network, said apparatus comprising:
means for receiving, from a client device, a request for a network address that is associated with a service, the request including a service authorization handle for indicating that the client is authorized for a level of service for the handling of the request;
means, responsive to service type and the service authorization level, for selecting a respective network address of one server selected from a plurality of servers that are available to provide said service; and
means for transmitting, to said client device, said respective network address so that said client device may transmit at least one service request to the server associated with the respective network address without the service request being re-mapped by an intermediate device.

10. A computer readable medium, associated with a domain name system server, for storing program code comprised of instructions operable, when executed, to transfer of information via a network, said instructions comprising:
instructions for receiving, from a client device, a request for a network address that is associated with a service, the request including a service authorization handle for indicating that the client is authorized for a level of service for the handling of the request;
instructions for selecting, responsive to service type and the service authorization handle, a respective network address of one server selected from a plurality of servers that are available to provide said service; and
instructions for transmitting, to said client device, said respective network address so that said client device may transmit at least one service request to the selected server without the service request being re-mapped by an intermediate device.

* * * * *